Patented Sept. 4, 1951

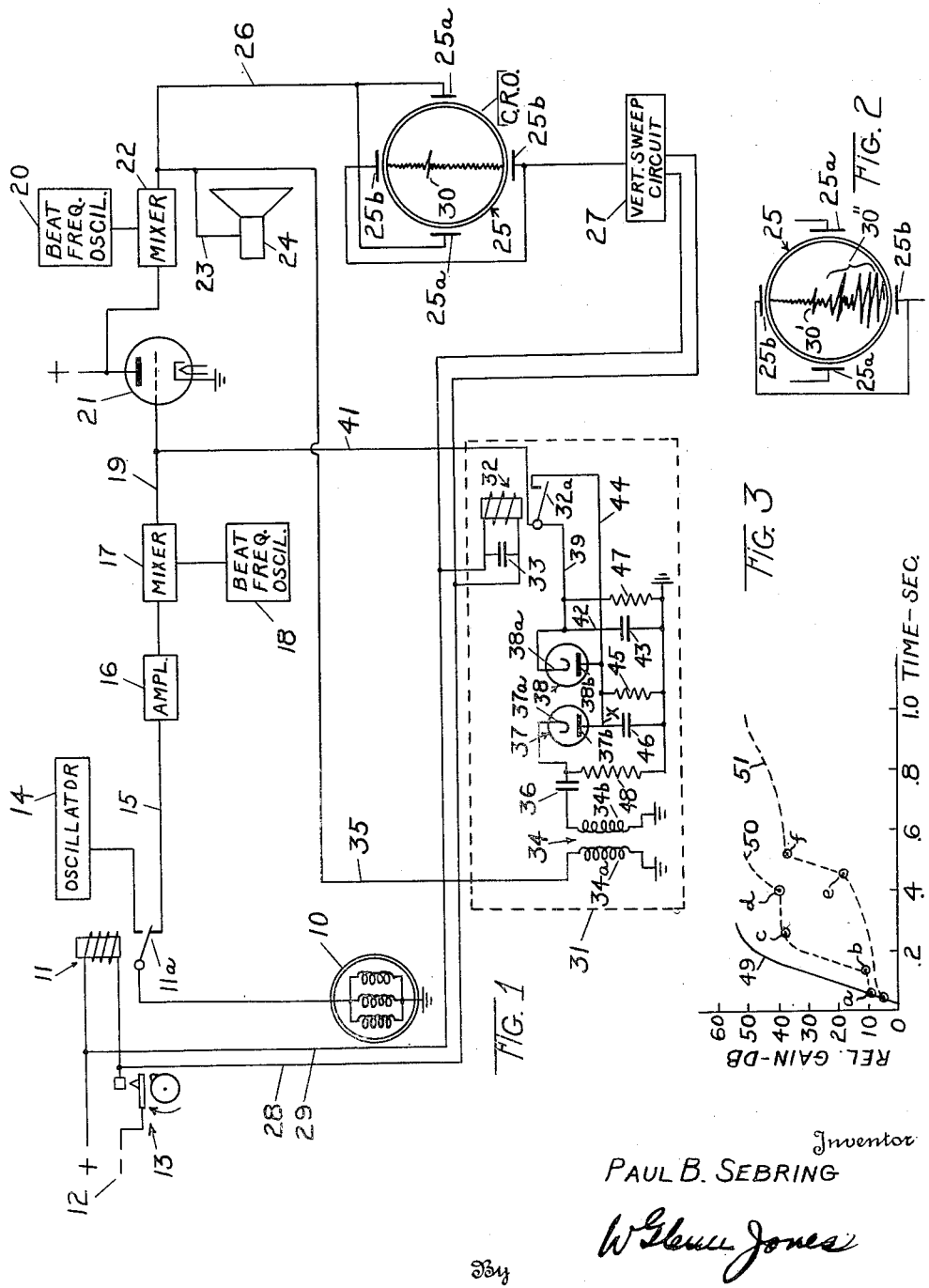

2,566,858

UNITED STATES PATENT OFFICE 2,566,858

REVERBERATION CONTROL OF GAIN

Paul B. Sebring, Cambridge, Mass., assignor to the United States of America as represented by the Secretary of the Navy Application June 29, 1944, Serial No. 542,795

8 Claims. (Cl. 177—386)

This invention relates to apparatus in which the direction and range of a target are determined by means of the echo technique. In one form of such apparatus, a pulse of energy having a directional characteristic is emitted from a projector which is movable to an position around the horizon. If a target is in the path of any such emitted pulse at any particular bearing on the horizon, an echo thereof will be returned to the projector. The bearing of the target is therefore the same as the bearing of the projector at which the echo pulse was returned and the range may be computed from the time required by the pulse to travel from the projector to the target and return therefrom.

More particularly, the invention relates to, and has for a general object, the provision of a novel arrangement for controlling the gain of the "receiver" portion of apparatus of the class described which is used for receiving the echo of the transmitted pulse.

The invention is of especial utility in underwater sound echo ranging and is described in this connection in the following specification. However, it should be expressly understood that it is equally applicable in conjunction with other forms of echo ranging apparatus.

In the application of underwater sound echo ranging apparatus, one of the difficulties encountered results from the fact that immediately followig the transmission of a sound pulse or "ping," the receiver elements of the apparatus is connected to the transducer and the reverberation of the sound is received. If the pulse is long enough and of sufficient strength to carry to and from the target with distinguishable intensity, the reverberation is, at times, very severe. Since an echo may be relatively quite weak, the receiver must have enough gain to amplify it to readily recognizable levels. The high gain required tremendously amplifies the reverberation producing a blast of sound from the loud speaker which is not only very discomforting to the operator but may at times so lower his aural acuity that he will miss a true target echo. If a visual receiver such as a cathode ray oscilloscope is utilized in lieu of, or in conjunction with a loud speaker, the high level of the reverberation produces a high degree of deflection of the cathode ray beam as it sweeps across the oscilloscope screen with the result that it is often very difficult to visually detect the jog of the beam which occurs when a true echo signal is received.

In application Serial No. 542,796, filed June 29, 1944, by Jarrett Lewis Hathaway for "Reverberation Control of Gain," the undesirable effect due to reverberation is reduce by initially reducing the gain of one or more amplifier stages in the receiver to a predetermined and constant level at the time each pulse is transmitted, from which gain recovery of the receiver is made as a function of both time and the instant level of the reverberation This invention is different from the arrangement disclosed in the aforesaid application in that it seeks to provide an arrangement wherein the gain of one or more amplifier stages of the receiver is initially reduced, not to a predetermined and constant level as in the aforesaid application, but only to a level which varies with the intensity level of the initially incoming reverberation. Thus if such reverberation is light, the gain of the receiver is reduced initially a rather small amount but if such reverberation is heavy, the initial reduction of receiver gain is correspondingly greater. The net result of this arrangement is that when reverberation is light, recovery of the receiver to full gain characteristic is made much quicker than is possible by the arrangement in the aforesaid application since the gain under this conditions would have been reduced but little to start with, whereas in the aforesaid application, the receiver gain under this condition would have been reduced initially to its preset, and much greater, amount.

A more specific object of the invention is to reduce the effect of reverberation in the receiver of echo ranging apparatus by initially applying a negative biasing potential on a control grid of one or more amplifier stages in the receiver at termination of a transmitted pulse, the amount of the biasing potential being made variable with the intensity of the initially incoming reverberation, which is sampled for this purpose; then discharging this potential through a circuit which includes a fixed impedance and, when conductive, a parallel connected first diode of comparatively much lower impedance, the conductivity of the first diode being controlled through a second diode which is connected to the first diode and also to the receiver output so that when reverberation reaches a predetermined threshold value in the receiver, its effect upon the second diode is such as to make the first diode non-conductive.

These and other objects of the invention will become more apparent from the following specifications read in connection with the accompanying drawings in which Fig. 1 is a schematic diagram illustrating a preferred form of the invention as applied to underwater echo ranging apparatus; Fig. 2 is a view of the oscilloscope screen showing the nature of reverberation on the screen without receiver gain control; and Fig. 3 shows plots of typical variations of gain with time in accordance with this invention as affected by reverberation.

For illustrating the invention, I have shown in Fig. 1, a highly simplified diagram of one form of an underwater sound echo ranging system with which the invention may be used. This system includes a projector or transducer 10 adapted to be placed beneath the surface of the water with its active face in a vertical position. The elements of the transducer may be either the piezoelectric or magnetostrictive type and are connected to act together.

A relay 11, the winding of which is energized intermittently from a source 12 through timer contactor 13, functions when energized to momentarily connect the output at supersonic frequency from transmitter oscillator 14 through its contacts 11a to the elements of transducer 10. The electrical energy imparted to the transducer elements, which is a pulse of comparatively short duration, causes a pulse of compressional wave energy to be projected through the water.

The dimensions of the transducer relative to the selected wave length of the energy pulse are such that the pulse is projected normal to the transducer and its transmitting pattern has a single major and relatively sharp lobe with its maximum in the plane normal to the active face of the transducer.

After the pulse of wave energy is projected, contacts 11a open immediately to connect the elements of the transducer into the receiver portion of the system. The reverberation of the transmitted pulse and later the true pulse echo from a remote target such as a submarine, which are picked up by transducer 10 are converted into electrical signals which feed over conductor 15 through an amplifier stage 16, if desired, and then into a mixer stage 17 where they are beat with the output from an oscillator 18, if desired, to produce a difference frequency output. The output from mixer 17 then feeds over conductor 19 into the control grid of amplifier 21. The output from amplifier 21 is then passed to a mixer 22 where it is beat to an audio frequency against an oscillator 20 and thence via conductor 23 to a loud speaker 24 and/or to the horizontal deflecting plates 25a of a cathode ray oscilloscope 25 via conductor 26.

The vertical deflecting plates 25b of the oscilloscope are connected to a sweepcircuit 27 of conventional construction, the arrangement being such that each time relay 11 is energized, a pulse is sent out over conductors 28, 29 to initiate a vertical sweep of the beam in the oscilloscope 25. Thus with the arrangement described, the pulse echo will be heard in the speaker 24 and also effect a horizontal jog 30 of the beam in the oscilloscope 25 as the beam moves upwards in its vertical path.

However as previously explained, the reverberation unless suppressed would produce an undesirable blast of sound from the speaker 24 which might mask reception of the subsequently following true echo pulse as reflected from a target. On the screen of oscilloscope 25, it would produce a deflection pattern similar to that shown in Fig. 2 and from which it would obviously be difficult to distinguish a true echo deflection such as jog 30', the reverberation being indicated at 30''.

In accordance with this invention, means are provided for blocking or reducing the gain of the receiver immediately following termination of a transmitted pulse but only to an extent which varies with the severity of the initially incoming reverberation which is "sampled" for this purpose. In other words, if the initial reverberation is mild, the gain of the receiver is reduced but little. On the other hand, if such reverberation is severe, the gain of the receiver is reduced considerably. Thus if little reverberation is encountered under prevailing conditions, recovery to full gain of the receiver is made quickly, since the gain is only slightly reduced. However if reverberation is heavy, a longer time will be required for the receiver to recover to its normal gain characteristic. Under both conditions, the ultimate result is the same which is a suppression of reverberation for the minimum required time so that better reception of a true echo pulse from a target may be obtained.

The apparatus for accomplishing this desirable result is enclosed within the broken line block 31. It includes a relay 32 which is energized from taps made to conductors 28, 29 at the same time that relay 11 is energized. A capacitor 33 is connected across the winding of relay 32 to delay the opening of its contacts 32a when the relay winding is deenergized and serves a function which will be explained later. A transformer 34 has its primary side 34a connected on one side to the ground and the other side connected via conductor 35 to the receiver output adjacent speaker 24. One side of the secondary 34b is also connected to ground and the other side connects through capacitor 36 to cathode 37a of a first diode 37. A second diode 38 is provided and its cathode 38a is connected via conductor 39 to the movable contact member of relay contacts 32a; via conductor 41 to the control or input grid of amplifier 21; and via conductor 42 to one plate of capacitor 43; the other plate thereof being connected to ground.

The fixed contact member of relay contacts 32a is connected via conductor 44 to both anodes 37b, 38b, of diodes 37, 38 respectively, and through parallel connected resistor 45 and capacitor 46 to ground. A resistor 47 is connected in parallel with capacitor 43 and a resistor 48 is connected between cathode 37a and ground.

*Operation*

It is previously explained that at the time relay 11 is energized, the output from oscillator 14 is momentarily connected to the elements of transducer 10 whereby a pulse of compressional wave energy is projected or beamed into the surrounding water medium. Also that when the energy pulse has terminated by opening of relay 11, the receiver portion of the apparatus is connected immediately to the transducer so that any echo of the pulse from an under water target will be detected.

When relay 11 becomes de-energized, relay 32 is likewise de-energized but, due to the action of capacitor 33, its contacts 32a remain closed for a short period thereafter, which period is sufficient for the initial blast of reverberation (that received from about 30 to 50 yards) to pass from the receiver by conductor 35 into the primary 34a of transformer 34. The resultant voltage induced in the secondary 34b causes current to flow through diode 37 to raise the potential at point X. The grid of amplifier 21 receives a blocking bias over the path including conductor 44, closed relay contacts 32a and conductor 41 equal to the potential at point X, and capacitor 43 is likewise charged to this potential over conductor 42.

Now when capacitor 33 has discharged through the winding of relay 32 to the extent where contacts 32a open, capacitor 43 will begin to discharge. The time of discharge of capacitor 43 determines the total time over which amplifier 21 is restored to full gain since the biasing potential on the grid of this amplifier depends upon the instant potential charge on capacitor 43.

It was previously explained that the discharge path for capacitor 43 has two branches, one through the fixed resistor 47 of relatively high impedance, and the other through the diode 38 and resistor 45 but only during the time that diode 38 is in a conductive state. If desired, fixed resistance 41 may be omitted and reliance placed on the diodes alone for control.

In the arrangement shown, diode 38 will be conductive provided the potential at point X (and hence also at anode 38b) does not reach a value equal to or in excess of the instant potential on capacitor 43 which appears at the cathode 38a. Such a value is referred to hereinafter as the "threshold."

Reverberation as found in underwater echo ranging apparatus follows no particularly set pattern and its level may vary greatly with time. For example, after the initial blast of reverberation has charged capacitor 43 to a potential proportional to its intensity, the reverberation may terminate abruptly. If such happens to be the case, the potential at point X will likewise terminate abruptly and capacitor 43 will continue to discharge without interruption through the two parallel paths, one of which comprises resistor 47 and the other diode 38 and resistor 45. As above noted, under such condition, most of the discharge will be via diode 38 and resistor 45 since these latter two form substantially a short circuit on capacitor 43. Gain recovery is thus very rapid and curve 49 in Fig. 3 might be typical for such a condition.

However, it may well be that after the initial blast of reverberation, its intensity may fall temporarily but again increase, followed by other decrease-increase cycles. Curves 50 and 51 in Fig. 3 have been included to illustrate how gain recovery of the receiver might vary with time under these latter conditions.

Following curve 50 from the origin (the 0 point on the time axis being the time when transmission of a pulse has terminated), it will be seen that the recovery rate follows along with curve 49 up to the point a which indicates that up to point a, there was no reverberation after the initial blast, the latter being used as previously described to place the initial bias on capacitor 43. However, at point a, it is seen that recovery stops until point b is reached. This cessation of recovery is of course caused by reverberation occurring between points a and b, and which has sufficient level to develop at point X, and hence at the anode 38b of diode 38 in Fig. 1, a negative potential equal to or exceeding that on cathode 38a of this diode. Thus from points a to b, capacitor 43 discharges very slowly since its only discharge path is through resistor 47, of very high impedance.

At point b, where the reverberation drops in level below the threshold value, diode 38 again becomes conductive and curve 50 again follows the slope of curve 49 until point c is reached. Point c is intended to indicate another increase in reverberation level to or above the threshold value which persists over to point d, preventing rapid gain recovery. From point d, it is seen that reverberation drops below the threshold value and the normal, rapid gain recovery rate is thereafter followed.

Curve 51 illustrates another condition in which the character of the reverberation subsequent to the initial blast is generally at a much higher level and lasts appreciably longer than in curve 50. It will be seen that during most of the entire recovery cycle, the reverberation is sufficiently strong to influence the recovery rate excepting over the short period between the points e and f.

In conclusion, it will be evident that this invention presents a novel, low cost, and highly satisfactory arrangement for controlling the gain of echo ranging receivers so as to reduce or minimize the effect of reverberation. The reverberation is suppressed by initially lowering the gain of the receiver to a point determined by the severity of the initial blast of reverberation; thereafter its recovery rate is made dependent not only upon time but also upon the instant level of the remainder of the reverberation to the desirable end that the gain of the receiver is held down only for the minimum period required to satisfactorily suppress the reverberation.

Since the reverberation is considerably suppressed, very little of it will be heard in the speaker 24 and the true target echo pulse when it comes in will be distinguished quite clearly. Likewise the deflection of the beam on the screen of oscilloscope 25 due to reverberation will be reduced to an inconsequential amount and the beam deflection, such as at 30, effected when the echo pulse from the target comes in, will stand out clearly on the screen.

Having thus fully described this invention, I claim:

1. In an echo ranging system including a receiver having at least one amplifier stage having a control element and a gain which is dependent on the amplitude of a direct current voltage fed to said control element; means for controlling the gain of said receiver comprising, means for biasing a control element of at least one of said amplifier stages to an extent proportional to the level of the initially incoming reverberation only, a discharge path for said biasing means, and means for selectively changing the impedance of said discharge path to a relatively high value when the reverberation exceeds a predetermined value and to a relatively low value when the reverberation is less than said value.

2. In an echo ranging system including a receiver having at least one amplifier stage having a control element and a gain which is dependent on the amplitude of a direct current voltage fed to said control element; means for controlling the gain of said receiver comprising, means for biasing a control element of at least one of said amplifier stages to an extent proportional to the level of the initially incoming reverberation only, a discharge path for said biasing means, said discharge path including a diode, and means for instantaneously rendering the diode either conductive or completely non-conductive in accordance with the relative magnitudes of the instant level of the remainder of the reverberation and the instant value of said bias.

3. In an echo ranging system including a receiver having at least one amplifier stage having a control element and a gain which is dependent on the amplitude of a direct current voltage fed to said control element; means for controlling the gain of said receiver comprising, means for biasing a control element of at least one of said amplifier stages to an extent proportional to the level of the initially incoming reverberation only, a discharge path for said biasing means, said discharge path including a first impedance and a diode connected in parallel therewith, said diode when conductive having an impedance value much lower than said first impedance, and means for instantaneously rendering the diode either conductive or completely non-conductive in accordance with whether the instant level of the remainder of the reverberation is less than or greater than, respectively, the instant value of said bias on the control element.

4. In an echo ranging system including a receiver having at least one amplifier stage having a control element and a gain which is dependent on the amplitude of a direct current voltage fed to said control element; means for controlling the gain of said receiver comprising, a first charging means initially charged to a voltage proportional to the initially received reverberation for biasing said control element of at least one of said amplifier stages to an extent proportional to the level of the initially incoming reverberation only, and a discharge path for said first charging means, said discharge path including: a first diode the cathode of which is connected to said first charging means, a second diode the cathode of which is connected to the output of said receiver, and connections between the anodes of said diodes, a second charging means coupled between said anodes and said first charging means for producing a voltage to render said second diode non-conductive to avert the discharge of said second charging means whenever the amplitude level of the received echoes exceeds a level determined by the instantaneous voltage of said first charging means.

5. In an echo ranging system including means for transmitting energy pulses from a projector to a target, and a receiver for detecting pulse echoes, said receiver including at least one amplifier stage having a control element and a gain which is dependent on the amplitude of a direct current voltage fed to said control element; means for controlling the gain of said receiver comprising a relay adapted when energized to hold its contacts closed; means for energizing said relay for a period ending substantially with reception by the receiver of the initially incoming reverberation, a capacitor, means connecting said capacitor through said relay contacts to a source of charging potential which varies with the level of the initially incoming reverberation, means connecting said capacitor to a control grid of at least one of the amplifier stages of said receiver to reduce the gain thereof, and means for discharging said capacitor after reception of the initially received reverberation signals.

6. In a echo ranging system including means for transmitting energy pulses from a projector to a target, and a receiver for detecting pulse echoes, said receiver including at least one amplifier stage having a control element and a gain which is dependent on the amplitude of a direct current voltage fed to said control element; means for controlling the gain of said receiver comprising, a circuit including a time delay relay adapted to make and hold a pair of contacts during a predetermined interval corresponding to initial reverberation transit time, a first diode having a cathode connected to the receiver output, a capacitor having one terminal thereof connected to said control element of said amplifier stage, means connecting the same said terminal of said capacitor to the anode of said first diode through said relay contacts while the contacts are closed whereby said capacitor will be charged to a potential proportional to the level of the initially incoming reverberation as it appears at the anode of said first diode and the gain of said receiver will be correspondingly reduced, and a discharge path for said capacitor, said discharge path including a second diode the cathode of which is connected to the other terminal of said capacitor terminal and the anode of which is connected to the anode of said first diode, whereby to normally aid the discharge of said capacitor, a second capacitor and a resistance discharge path therefor coupled between the other terminal of the first said capacitor and the said anodes of said diodes, said second diode becoming non-conductive to avert the discharge of said first mentioned capacitor whenever the voltage across said second capacitor originating from the receiver output exceeds the voltage across said first mentioned capacitor.

7. In an echo ranging system including a receiver having at least one amplifier stage having a control element and a gain which is inversely proportional to the amplitude of a direct current control voltage fed to said control element, the improvement comprising a control voltage source for said amplifier comprising: a first and second charging means, means for continuously coupling the received echoes to said first charging means for charging same to a voltage proportional to the amplitude of the received echoes, a first switch means for connecting said first and second charging means in parallel circuit relation upon actuation thereof, said second charging means charging to the same voltage as said first charging means when connected in parallel circuit relation therewith, means for actuating said switch means to connect said charging means in parallel circuit relation following the transmission of a pulse of energy for an interval including the time of reception of the initially incoming reverberation echoes, and to deactivate said switch means after reception of the initially received reverberation echoes whereby the voltage to which said second charging means is initially charged is dependent solely on the amplitude of the initially received echoes, a discharge path for said first and second charging means for gradually discharging them, and means for coupling the gradually decaying voltage of said second charging means to said control element of said amplifier stage to control the gain thereof.

8. In an echo ranging system including a receiver having at least one amplifier stage having a control element and a gain which is inversely proportional to the amplitude of a direct current control voltage fed to said control element, the improvement comprising a control voltage source for said amplifier comprising: a first and second charging means, means for continuously coupling the received echoes to said first charging means for charging same to a voltage proportional to the amplitude of the received echoes, a first switch means for connecting said first and second charging means in parallel circuit relation upon actuation thereof, said second charging means charging to the same voltage as said first charging means when connected in parallel circuit relation therewith, means for actuating said switch means to connect said charging means in parallel circuit relation following the transmission of a pulse of energy for an interval including the time of reception of the initially incoming reverberation echoes, and to deactivate said switch means after reception of the initially received reverberation echoes, whereby the voltage to which said second charging means is initially charged is dependent solely on the amplitude of the initially received echoes, a first discharge path for said first charging means to discharge same in the absence of received echoes, a second discharge path for said second charging means including a rectifier device extending in series circuit relation between said first and second charging means for aiding the discharging of said second charging means when the voltage across said second charging means exceeds the voltage across said first charging means, and means coupling the voltage across said second charging means to said control element of said amplifier to control the gain thereof.

PAUL B. SEBRING.

REFERENCES CITED

The following references are of record in the file of this patent:

UNITED STATES PATENTS

| Number | Name | Date |
| --- | --- | --- |
| 2,158,198 | Prescott | May 16, 1939 |
| 2,167,492 | Sproule | July 25, 1939 |
| 2,297,319 | Parr | Sept. 29, 1942 |
| 2,306,991 | Groenendyke | Dec. 29, 1942 |
| 2,316,354 | Moritz | Apr. 13, 1943 |
| 2,352,825 | Fay | July 4, 1944 |